(12) United States Patent
Yun

(10) Patent No.: US 8,564,667 B2
(45) Date of Patent: Oct. 22, 2013

(54) SURVEILLANCE SYSTEM

(75) Inventor: Il Dong Yun, Seongnam-si (KR)

(73) Assignee: Empire Technology Development LLC, Wilmington, DE (US)

(*) Notice: Subject to any disclaimer, the term of this patent is extended or adjusted under 35 U.S.C. 154(b) by 1068 days.

(21) Appl. No.: 12/545,728

(22) Filed: Aug. 21, 2009

(65) Prior Publication Data

US 2011/0043628 A1 Feb. 24, 2011

(51) Int. Cl.
*H04N 7/18* (2006.01)
(52) U.S. Cl.
USPC ............................ 348/159; 348/143
(58) Field of Classification Search
USPC ................................. 348/143, 159
See application file for complete search history.

(56) References Cited

U.S. PATENT DOCUMENTS

| | | | |
|---|---|---|---|
| 6,741,250 B1 | 5/2004 | Furlan et al. | |
| 6,954,224 B1* | 10/2005 | Okada et al. | 348/159 |
| 7,187,402 B2* | 3/2007 | Yonezawa et al. | 348/159 |
| 7,440,594 B2* | 10/2008 | Takenaka | 382/118 |
| 7,668,345 B2* | 2/2010 | Kiyohara et al. | 382/115 |
| 2005/0065802 A1* | 3/2005 | Rui et al. | 705/1 |
| 2005/0225638 A1* | 10/2005 | Tanaka et al. | 348/159 |
| 2006/0222209 A1* | 10/2006 | Zhang et al. | 382/107 |
| 2007/0039030 A1* | 2/2007 | Romanowich et al. | 725/105 |

OTHER PUBLICATIONS

M. Sanjeev Arulampalam, et al "A Tutorial on Particle Filters for Online Nonlinear/Nun-Gaussian Bayesian Tracking" IEEE Transactions on Signal Processing, vol. 50, No. 2, Feb. 2002; pp. 174-188.
Dorin Comaniciu, et al "Kernel-Based Object Tracking" Online: http://www.caip.rutgers.edu/~comanici/Papers/KernelTracking.pdf, May 2003.
Richard Hartley, et al "Multiple View Geometry CVPR Jun. 1999" Computer Vision Second Edition, Cambridge University Press, Mar. 2004.
P. Viola, et al "Rapid Object Detection Using a Boosted Cascade of Simple Features" Mitsubishi Electric Research Laboratories May 2004, Online: http://merl.com/reports/docs/TR2004-043.pdf.
Mitsubishi Electric, Modification date Jul. 15, 2004; "Object Tracking & Understanding" Online: http://www.merl.com/projects/ObjectTracking.

* cited by examiner

*Primary Examiner* — Thomas Dailey
(74) *Attorney, Agent, or Firm* — Maschoff Brennan

(57) ABSTRACT

A surveillance system including a tracking module, a controller and a detection module is provided. The tracking module processes at least one first image frame that is acquired via a first camera to track an object in the at least one first image frame, and generate location information of the object being tracked. The controller generates a control signal based on the location information and transmits the control signal to a second camera to control the movement of the second camera. The detection module processes at least one second image frame that is acquired via the second camera to detect a feature part of the object being tracked.

20 Claims, 7 Drawing Sheets

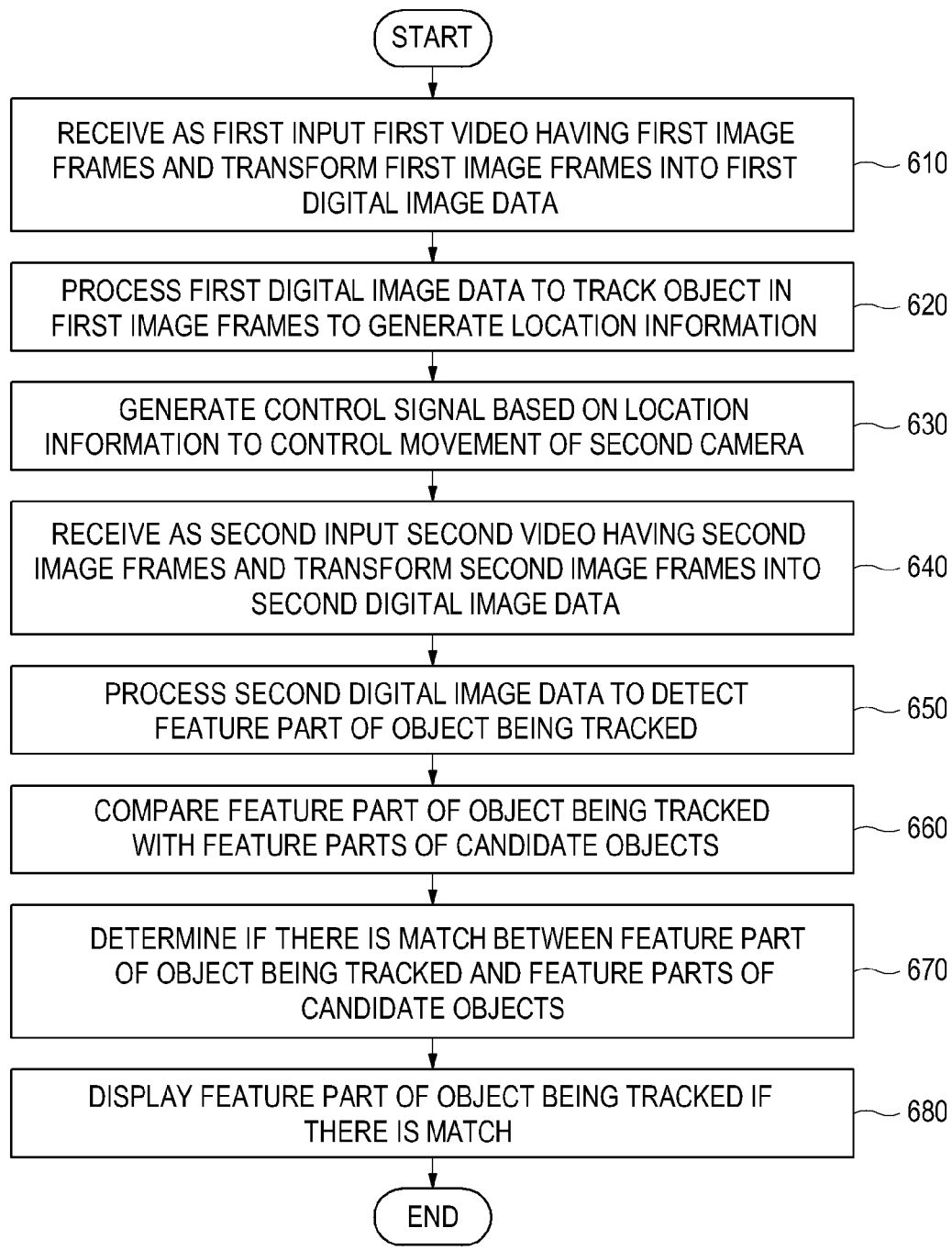

SURVEILLANCE SYSTEM

BACKGROUND

Recent developments in the field of computer vision remarkably improved some application areas of science and technology such as surveillance systems. There is an increasing demand for surveillance systems capable of monitoring a restricted region such as banks, public institutions, congested roads or the like.

In line with the increasing demand for such surveillance systems, there is a need to capture clear images of a particular object (e.g., suspect) to allow for the apprehending of a target object (e.g., wanted criminal). Due to the low image quality of stored images and the requirement for large storage capacity for images having high image quality, finding suspects on a "wanted list" can pose a serious challenge when the exact time of a crime is unknown and when authorities have a large amount of recorded videos to review.

SUMMARY

Various embodiments of surveillance systems and surveillance techniques are provided. In one embodiment, by way of non-limiting example, a surveillance system includes a tracking module configured to track an object in at least one first image frame that is acquired through the use of a first image capturing device and generate location information of the object being tracked, and a controller configured to generate a control signal based on the location information and to transmit the control signal to a second image capturing device to control the movement of the second image capturing device. The surveillance system further includes a detection module configured to detect a feature part of the object being tracked from a second digital image data of at least one second image frame that is acquired through the use of the second image capturing device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6 is a flow chart of an illustrative embodiment of a surveillance method.

DETAILED DESCRIPTION

Figure 1:
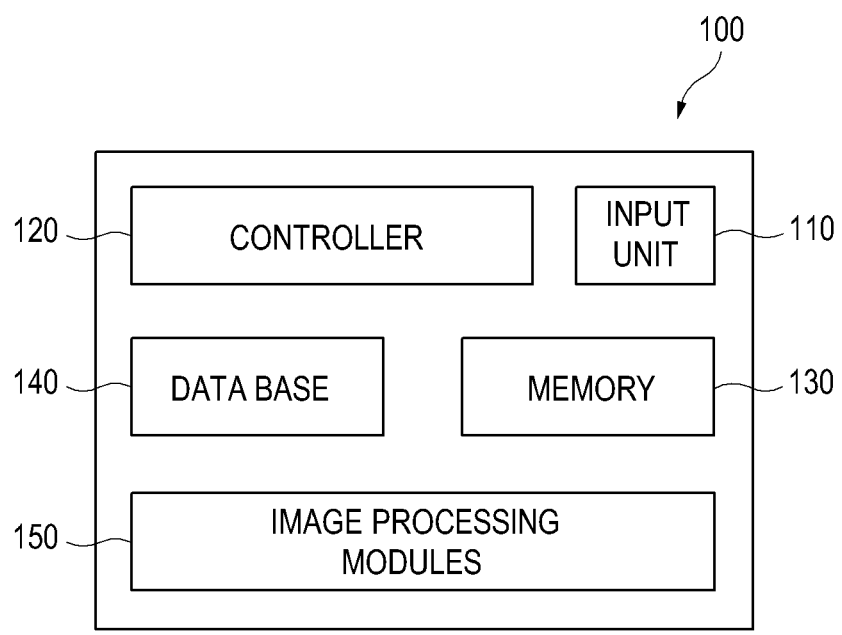
FIG. 1 shows a schematic block diagram of an illustrative embodiment of a surveillance system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and made part of this disclosure.

It is to be understood that apparatus and method according to the illustrative embodiments of the present disclosure may be implemented in various forms including hardware, software, firmware, special purpose processors, or a combination thereof. For example, one or more example embodiments of the present disclosure may be implemented as an application having program or other suitable computer-executable instructions that are tangibly embodied on at least one computer-readable media such as a program storage device (e.g., hard disk, magnetic floppy disk, RAM, ROM, CD-ROM, or the like), and executable by any device or machine, including computers and computer systems, having a suitable configuration. Generally, computer-executable instructions, which may be in the form of program modules, include routines, programs, objects, components, data structures, etc. that perform particular tasks or implement particular abstract data types. The functionality of the program modules may be combined or distributed as desired in various embodiments. It is to be further understood that, because some of the constituent system components and process operations depicted in the accompanying figures can be implemented in software, the connections between system units/modules (or the logic flow of method operations) may differ depending upon the manner in which the various embodiments of the present disclosure are programmed.

FIG. 1 shows a schematic block diagram of an illustrative embodiment of a surveillance system 100. As depicted, surveillance system 100 may include an input unit 110, a controller 120, a memory 130, a database 140, and image processing modules 150. Input unit 110 receives input videos, each video having at least one image frame captured by an image capturing device (not shown) such as a camera, a camcorder or the like. For example, input unit 110 may be coupled to a first camera and receive a video having image frames captured or taken by the first camera. Input unit 110 may also be coupled to a second camera and receive a video having image frames captured or taken by the second camera. Depending on the particular implementation requirements, the first camera may be a wide-angle camera, and the second camera may be a narrow-angle camera. In some embodiments, input unit 110 may include two input subunits (e.g., a first input subunit and a second input subunit). The first input subunit may be coupled to the first camera to receive a first video, and the second subunit may be coupled to the second camera to receive a second video. Input unit 110 may transform the image frame or frames of a received video into digital image data. Input unit 110 may use any of a variety of well-known data processing techniques such as analog to digital conversion, quantization or the like to obtain digital image data from an image frame(s) of a video. The digital image data may represent features of the image frames such as intensity, color or the like, at various pixel locations of the image frames. In one embodiment, input unit 110 may include a digital converter (not shown) that transforms the image frames into digital image data.

In some embodiments, input unit 110 may include an interface. The interface may allow an operator of surveillance system 100 to enter or input instructions. Some non limiting types of instructions that may be entered via the interface may include instructions to receive a video or videos as input, instructions to display a previously input video, instructions to display one or more operational results, or instructions to otherwise operate surveillance system 100. Examples of suitable interfaces include but are not limited to a keypad, a keyboard, a mouse, a touch pad, a touch screen, a pointing device, a trackball, a light pen, a joystick, a speech recognition device, a stylus device, an eye and head movement tracker, a digitizing tablet, a barcode reader, or the like.

Controller 120 is configured to control the operations of the components or units/modules of surveillance system 100. Controller 120 may operate input unit 110 to receive videos having image frames from one or more image capturing devices (e.g., a first camera) according to a predetermined processing sequence/flow. For example, controller 120 may configure image processing modules 150 to process the video received as input via input unit 110 to generate information regarding or associated with the video (e.g., location information of an object in the video). Controller 120 may be configured to generate a control signal based on the information generated by image processing modules 150, and to transmit the generated control signal to control the operation or movements of another image capturing device (e.g., a second camera).

In some embodiments, controller 120 may include processors, microprocessors, digital signal processors (DSPs), microcontrollers, or the like. Controller 120 may include at least one embedded system memory to store and operate software applications, including an operating system, at least one application program, and other program modules. Controller 120 facilitates the running of a suitable operating system configured to manage and control the operations of surveillance system 100. These operations may include the input and output of data to and from related software application programs/modules. The operating system may provide an interface between the software application programs/modules being executed on controller 120 and, for example, the hardware components of surveillance system 100. Examples of suitable operating systems include Microsoft Windows Vista®, Microsoft Windows®, the Apple Macintosh® Operating System ("MacOS"), UNIX® operating systems, LINUX® operating systems, or the like.

Memory 130 may be used for storing data that is communicated between the components or units/modules of surveillance system 100. Various components or units/modules of the surveillance system 100 may utilize memory 130 (including volatile and nonvolatile) for data processing. For example, input unit 110 may store one or more digital image data that is acquired via one or more image capturing devices (e.g., a first digital image data via a wide-angle camera and a second digital image data via a narrow-angle camera) into memory 130 for processing by image processing modules 150. Image processing modules 150 may retrieve and process the digital image data from memory 130.

Memory 130 may include any computer-readable media such as a Read Only Memory (ROM), EPROM (Erasable ROM), EEPROM (Electrically EPROM), or the like. In addition, memory 130 may be a removably detachable memory to allow replacement if and/or when necessary (e.g., when becoming full). Thus, memory 130 may also include one or more other types of storage devices such as a SmartMedia® card, a CompactFlash® card, a MemoryStick®, a MultiMediaCard®, a DataPlay® disc, and/or a SecureDigital® card.

Database 140 may store one or more multimedia content files, such as JPEG image files, MPEG video files or other data associated with the files. For example, database 140 may store still images of candidate objects together with related information such as candidate object descriptors, which provide identifying information related to the candidate objects. Controller 120 may upload at least one still image of each of the candidate objects stored on database 140 to memory 130 for execution. Database 140 may store the still images of the candidate objects using any of a variety of well-known data structures. For example, a candidate object descriptor of the candidate object may reference at least one still image (e.g., front face image) of a candidate object stored in the form of an array in database 140. Database 140 may be implemented on a flash memory cell, but can be implemented on any storage device known in the art, such as magnetic media, EEPROM, optical media, tape, soft or hard disk, or the like.

In one embodiment, image processing modules 150 may process the digital image data generated or produced by input unit 110, e.g., the digital image data generated from the image frames captured by an image capturing device such as a camera, a wide-angle camera, a narrow-angle camera, or the like. For example, as part of the processing of the digital image data, image processing modules 150 may capture, identify, detect and/or track an object between multiple image frames. When processing certain digital image data, such as digital image data captured using a narrow-angle camera, image processing modules 150 may capture, identify, detect and/or track a feature part of the object that was captured, identified, detected and/or tracked using the image frames acquired via another image capturing device, such as a wide-angle camera. Image processing modules 150 may access database 140 to retrieve information for at least one still image of a feature part of a candidate object along with information regarding the candidate object. The information of a feature part of the candidate object may be used to determine whether such feature part is similar to the detected feature part of the object being tracked. In some embodiments, image processing modules 150 may be implemented by software, hardware, firmware or any combination thereof.

Surveillance system 100 may include a display (not shown) to provide a visual output such as a video (e.g., video captured by the first camera and/or video captured by the second camera) and/or the results of the processing of the digital image data, etc., for viewing, for example, by an operator. The display may include, but is not limited to, flat panel displays, including CRT displays, as well as other suitable output devices. Surveillance system 100 may also include other peripheral output devices (not shown), such as a speaker or a printer.

In some embodiments, surveillance system 100 may further include a communication module that provides logical connectivity to at least one external device via a wired or wireless communication protocol. A communication protocol (either wired or wireless) may be implemented by employing a digital interface protocol, such as a serial port, parallel port, PS/2 port, universal serial bus (USB) link, firewire or IEEE 1394 link, or wireless interface connection, such as an infrared interface, BlueTooth®, ZigBee, high-definition multimedia interface (HDMI), high-bandwidth digital content protection (HDCP), wireless fidelity (Wi-Fi), local area network (LAN), wide area network (WAN) or the like. In some embodiments, the communication module may include a modem to communicate through mobile communications systems such as a Global System for Mobile Communications (GSM), Global Positioning System (GPS), Digital Mobile Multimedia (DMB), Code Division Multiple Access (CDMA), High-Speed Down Link Packet Access (HSDPA), Wi-Bro Wireless Broadband, or the like. It will be appreciated that the connection methods described in the present disclosure are only examples and other methods of establishing a communications link between the devices/computers may be used.

In a networked environment, part or all of the components of surveillance system 100 may be implemented as a distributed system through two or more devices, depending on the desired implementations. For example, database 140 and image processing modules 150 may be implemented on a server, and other modules/components of surveillance system 100 may be implemented at a mobile device or terminal. In this example, the mobile terminal may transmit the digital image data of the object being tracked to the server via the communication module, so that the server may retrieve a matched object from its database to transmit information on the matched object to the mobile terminal. Surveillance system 100 may operate in a networked environment using logical connections to one or more remote devices, such as a remote computer. The remote computer may be a personal computer, a server, hand-held or laptop devices, a router, a network PC, a peer device, or other common network nodes, and typically may include some or all of the components described in the present disclosure relative to surveillance system 100.

Surveillance system 100 of FIG. 1 is only one example of a suitable operating environment and is not intended to be limiting. Other well known computing systems, environments, and/or configurations that may be suitable for the image processing described in the present disclosure include, but are not limited to, personal computers, portable devices such as cellular phones, server computers, hand-held or laptop devices, multiprocessor systems, micro-processor based systems, programmable consumer electronics, network personal computers, mini-computers, mainframe computers, distributed computing environments that include any of the units or devices illustrated in FIG. 1, or the like.

Figure 2:
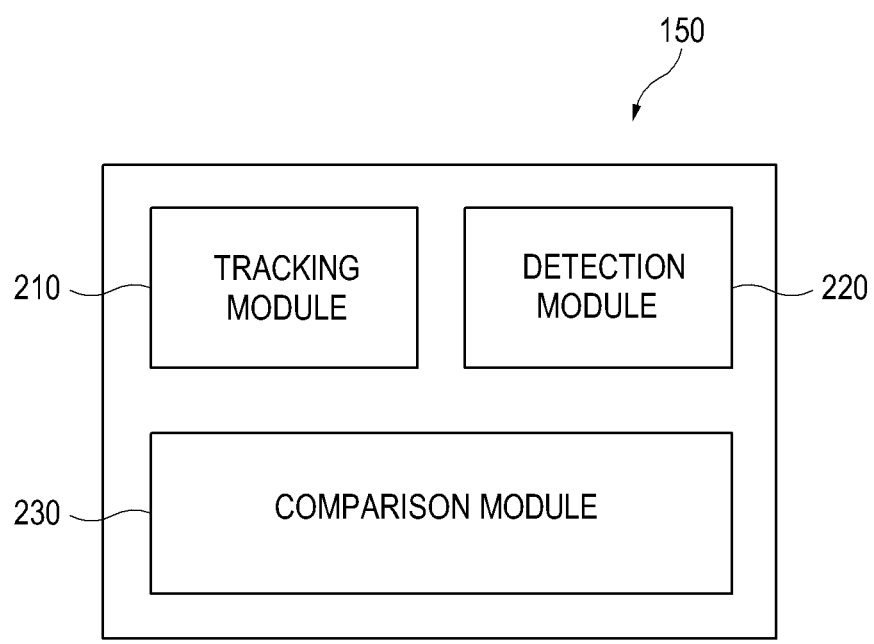
FIG. 2 shows a schematic block diagram of an illustrative embodiment of image processing modules of the surveillance system of FIG. 1.

FIG. 2 shows a schematic block diagram of an illustrative embodiment of image processing modules 150 suitable for use in a surveillance system (e.g., surveillance system 100 of FIG. 1). In one embodiment, image processing modules 150 may perform image data processing on digital image data produced or generated from an image frame or frames of a video of an object, including a moving object captured using an image capturing device. As shown in FIG. 2, image processing modules 150 may include a tracking module 210, a detection module 220, and a comparison module 230.

In one embodiment, tracking module 210 processes first digital image data of at least one first image frame to track an object (e.g., a person) in the at least one first image frame. The first image frame(s) may have been captured or acquired by a first camera. Tracking module 210 may localize the object (or multiple objects) to be tracked in an initial image frame among the first image frames, or identify an object that is to be tracked based on input from an operator, e.g., via input unit 110. Tracking module 210 may process the first digital image data of the first image frames having an object (or multiple objects) being tracked. Tracking module 210 may process first digital image data to determine the location information of the object being tracked. In some embodiments, the location information may be determined by processing multiple first image frames to identify and track an object over some or all of the multiple image frames. Tracking module 210 may use any of a variety of well-known object tracking techniques including, but not limited to, a kernel-based tracking algorithm, a contour tracking algorithm, a particle filtering algorithm, or the like, to track an object. As is generally known by one of ordinary skill in the art, a kernel-based tracking algorithm measures the similarity between objects in consecutive image frames (e.g., the first image frames), and the contour tracking algorithm employs Snakes, and active contour models, to extract object contours. Tracking module 210 may store the location information in memory 130 for further processing by other units/modules such as controller 120. For example, controller 120 may be configured to generate a control signal based on location information and transmit the control signal to a second image capturing device to control the movement of the second image capturing device.

Detection module 220 processes second digital image data of at least one second image frame to identify or detect a feature part (e.g., a face) of an object (e.g., a person) being tracked. The second image frame(s) may have been captured or acquired by a second camera. Detection module 220 may use any of a variety of well-known feature detection techniques to identify a feature of an object. For example, detection module 220 may employ the AdaBoost algorithm which uses Haar-like features to detect a face or facial features of a person. It should be appreciated that the aforementioned feature detection algorithm is only one example and other feature detection techniques may be used. Detection module 220 may store information (e.g., a part of the second digital image data) regarding the identified or detected feature of the object being tracked in memory 130.

Comparison module 230 may read information regarding the identified or detected feature of the object being tracked from memory 130. Comparison module 230 may retrieve information regarding feature parts of candidate objects (e.g., still image of feature parts of candidate objects) from database 140. Comparison module 230 may process the information regarding the identified or detected feature of the object being tracked and the information regarding feature parts of candidate objects. For example, comparison module 230 may compare the feature part (e.g., a facial feature) of the object (e.g., a person) being tracked with feature parts of candidate objects to determine if there is a match. Comparison module 230 may use any of a variety of facial recognition algorithms to compare the facial feature detected by detection module 220 with facial features of the candidate objects. Some facial recognition algorithms may extract landmarks from a digital image data (e.g., the second digital image data) of the object's face to identify and compare faces of the object being tracked and faces of the candidate objects. For example, comparison module 230 may perform the facial recognition algorithms to analyze the landmarks such as the relative position, size, and/or shape of the eyes, nose, cheekbones, and/or jaw. Comparison module 230 may use these landmarks to search for other faces of candidate objects having one or more of the landmarks. The facial recognition algorithms may include, but not be limited to, eigenface, fisherface, the Hidden Markov model, the neuronal motivated dynamic link matching, or the like. Comparison module 230 may identify similarities between the feature part in the second image frame ("target image") of the object being tracked and the feature parts in the still images of candidate objects ("candidate images"). In this way, comparison module 230 compares the object being tracked with the candidate objects for similarities. In some embodiments, similarities are determined by comparing the object being tracked with the entire candidate object, and in other embodiments, similarities are determined by comparing the object being tracked with portions of the candidate object. The similarities may be identified through any of a variety of well-known techniques, e.g., by calculating or measuring the distance between feature parts of the target image and feature parts of the candidate image. Comparison module 230 may determine that there is a match based on the similarities between the target image and the candidate images, for example, when the candidate image(s) has a distance(s) less than a threshold distance from the target image. When comparison module 230 determines that there is a match between the feature part of the object being tracked and the feature parts of the candidate objects, comparison module 230 may display the target image and the candidate images on an output unit (e.g., display) for viewing by the user.

Figure 3A:
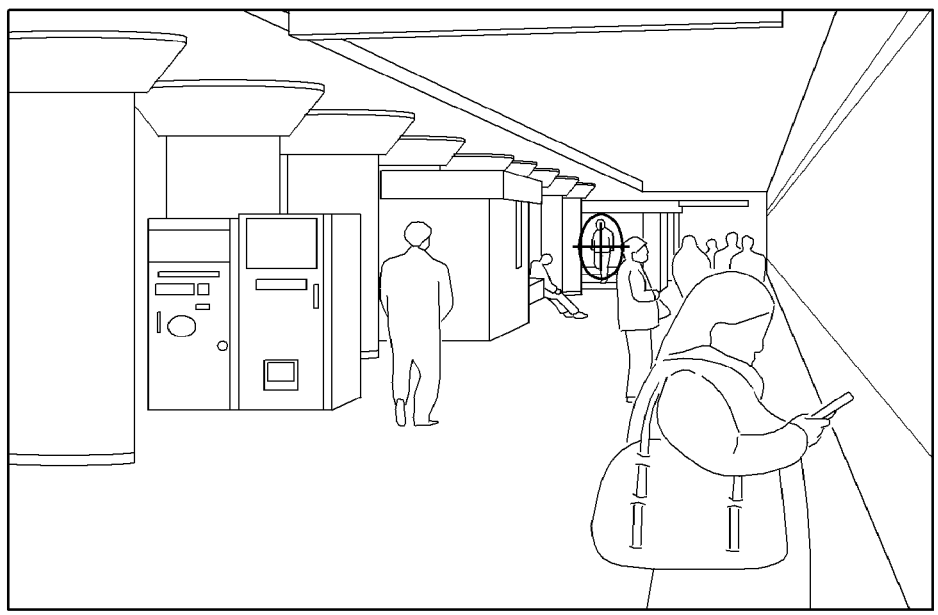
FIGS. 3A to 3C illustrate an illustrative embodiment of an object tracking technique.
Figure 3B:
Figure 3C:
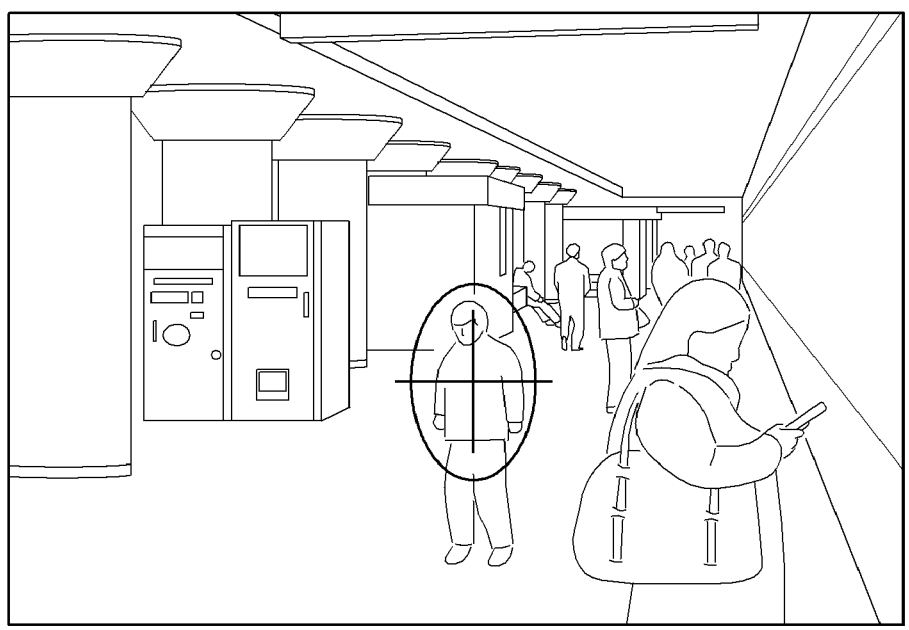

FIGS. 3A to 3C illustrate an illustrative embodiment of an object tracking technique suitable for use by tracking module 210 of FIG. 2. FIGS. 3A to 3C show three consecutive first image frames of a video acquired using a first camera. In one embodiment, tracking module 210 may process the first digital image data of the initial image frame of the first image frames to thereby identify a particular object, such as a person, in the initial image frame (as indicated by "+" in FIG. 3A). The identified object (person) is the object (person) that is being tracked. In the discussion of FIGS. 3A to 3C that follows, the terms "object" and "person" will be interchangeably used for simplicity and ease of explanation. Tracking module 210 may also generate location information of the identified person in the initial image frame by processing the first digital image data of the initial image frame. For example, tracking module 210 may determine the coordinates (e.g., pixel position) of the first digital image data that corresponds to the location of the identified person (as indicated by "+" in FIG. 3A) to generate the location information of the person being tracked. Tracking module 210 may process the first digital image data of the next two image frames in a substantially similar manner as in processing the initial image frame, thereby generating the location information of the identified person in the next image frames (as indicated by "+" in FIGS. 3B and 3C). Tracking module 210 may temporarily store the location information of the identified person (the object being tracked) in each image frame to memory 130. In this way, tracking module 210 may find and track an object between consecutive image frames.

Upon generating the location information of the object being tracked in the first image frames acquired using the first camera, controller 120 may generate a control signal based on the location information to control the operation of a second camera. Controller 120 may transmit the control signal to the second camera to control the movement of the second camera, e.g., using a communication module. The control signal may operate or control the second camera to pan and/or zoom in/out so that the second camera may capture a feature part (e.g., a face) of the object (e.g., a person) that is being tracked. Controller 120 may define the positional relationship between the first camera and the second camera. In some embodiments, the first camera and the second camera may view portions of the same region so that one point in the first image frames may be mapped to another point in the second image frames. The first image frames and the second image frames may have been captured or acquired by the first camera and the second camera, respectively. Controller 120 may use the location information of the object being tracked in the first image frames, and the positional relationship between the first camera and the second camera to thereby generate the control signal to control the movement of the second camera. For example, controller 120 may process the location information of the object being tracked in the first image frames with the positional relationship between the first camera and the second camera to thereby estimate the location over which the second camera is to cover and emphasize by panning and/or zooming in/out. In this way, controller 120 may allow the second camera to capture the feature part of the object being tracked.

Figure 4:
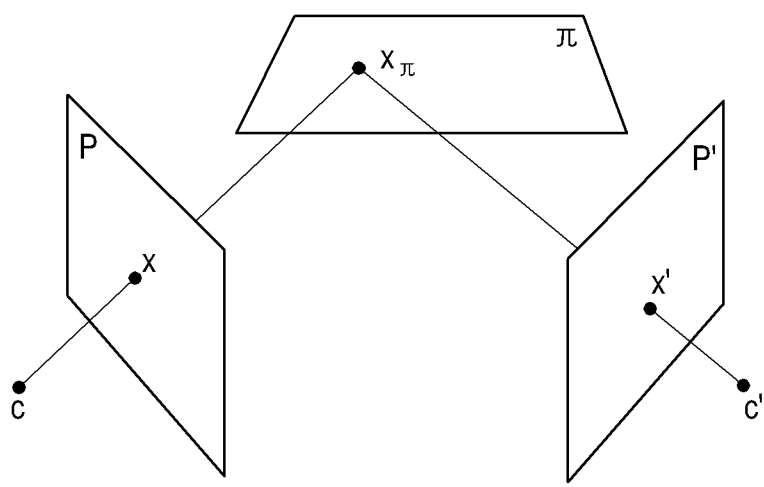
FIG. 4 shows a geometry for mapping corresponding points between two image frames captured by two cameras respectively.

FIG. 4 illustrates a geometry for mapping corresponding points between the first and the second image frames captured by the first and the second cameras, respectively. In FIG. 4, the points C and C' denote the center points of the first and the second cameras, respectively, and the physical plane having a particular point $x_\pi$ thereon that is viewed by the first and the second cameras is indicated by $\pi$. Planes P and P' correspond to the first and the second image frames that are acquired using the first and the second cameras, respectively. Given the geometry, a particular point $x_\pi$ is projected with an x on plane P, and the particular point $x_\pi$ is projected with an x' on plane P'. Controller 120 may define the correlation between the projected points x and x' of the particular point $x_\pi$ on the physical plane $\pi$. In a similar manner, controller 120 may define the correlation between the projected points onto the planes P and P' for a predetermined number of points on the physical plane $\pi$. Controller 120 may use these previously-defined correlations between the projected points onto the planes P and P' for one or more points on the physical plane $\pi$ to generate a transformation matrix between an arbitrary point in the first image frame and a corresponding point in the second image frame. Controller 120 may use the transformation matrix to estimate the corresponding point in the second image frame given an arbitrary point (e.g., a point where the object being tracked is located) in the first image frame. Controller 120 may define the transformation matrix between the first and the second image frames in advance, for environments where the locations of the first and the second cameras are substantially fixed (e.g., cameras in a bank). Otherwise, controller 120 may periodically update the transformation matrix as required. In this way, controller 120 may define the positional relationship between the first camera and the second camera.

Figure 5A:
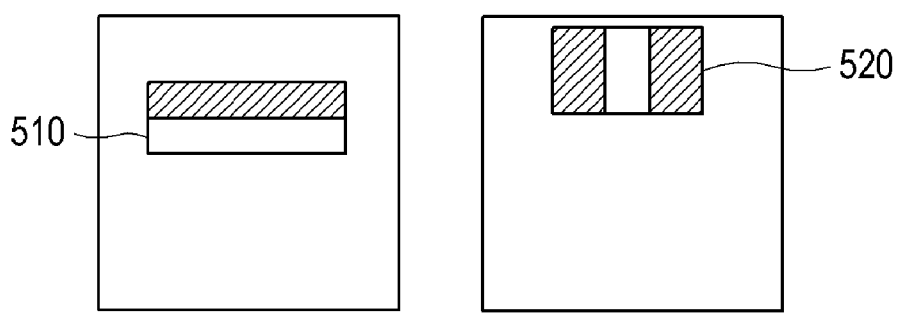
FIGS. 5A and 5B show an illustrative embodiment of a face detection technique.
Figure 5B:
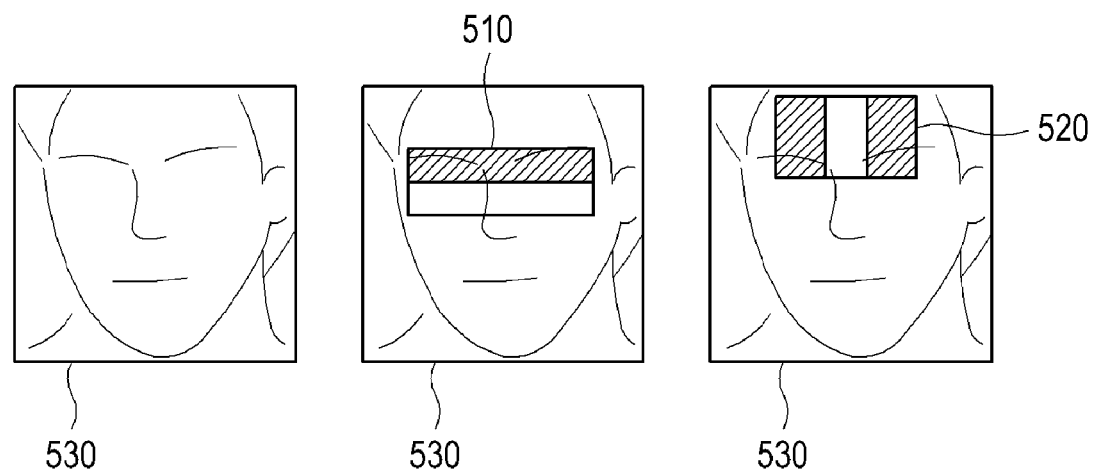

FIGS. 5A and 5B show an illustrative embodiment of a face detection technique suitable for use by, for example, detection module 220 of FIG. 2. Detection module 220 may be configured to process second digital image data of at least one second image frame to identify or detect a feature part (e.g., a bodily feature, a face) of an object (e.g., a person) being tracked. In one embodiment, detection module 220 may apply one or more feature screening filters onto the second digital image data of each second image frame. Detection module 220 may use, e.g., two feature screening filters 510 and 520 shown in FIG. 5A. In some embodiments, these filters may include horizontal feature screening filter 510 and vertical feature screening filter 520 to enable detection of a face of a person in the second image frames. Detection module 220 may apply horizontal feature screening filter 510 onto the second digital image data to measure the difference between a region of the eyes and a region across the upper cheeks in the second image frame (the middle figure of FIG. 5B). The second digital image data may represent, for example, the intensity of the second image frame. Thus, the difference in intensity between the regions divided by horizontal feature screening filter 510 (e.g., eye region and cheek region) in the second image frame indicates intensity distribution around a face of a person in the second image frame. Horizontal feature screening filter 510 applies the observation that the eye region is generally darker than the cheek region. In similar fashion, detection module 220 may apply vertical feature screening filter 520 onto the second digital image data to compare the intensities in the eye regions to the intensity across the bridge of the nose (the right figure of FIG. 5B). Detection module 220 may move the location of horizontal feature screening filter 510 and vertical feature screening filter 520 throughout the second image frame 530. Detection module 220 may be configured to detect the face of the person when the difference in intensity between the upper and lower parts of horizontal feature screening filter 510 exceeds a predetermined horizontal threshold, and/or the difference in intensity between the center part of vertical feature screening filter 520 and the marginal (i.e., left and right) parts of vertical feature screening filter 520 exceeds a predetermined vertical threshold. Detection module 220 may store the second digital image data of the second image frame in which the feature part of the object being tracked is detected, e.g., in memory 130. It should be appreciated that although FIG. 5A shows horizontal and vertical feature screening filters 510 and 520, the shape of the feature screening filter may be determined according to various factors such as the statistical characteristics (e.g., average intensity distributions) of the feature part of the object to be tracked and detected.

FIG. 6 is a flow chart of an illustrative embodiment of a surveillance method. In block 610, input unit 110 receives as a first input a first video having at least one first image frame. The first image frame(s) may be captured or acquired by a first image capturing device (e.g., a wide-angle camera). Input unit 110 may transform the first image frames into first digital image data using any of a variety of well-known data processing techniques such analog to digital conversion, quantization or the like.

In block 620, tracking module 210 processes the first digital image data of at least one first image frame to track an object (e.g., a person) in the first image frames. Tracking module 210 may localize each object in the initial image frame of the first image frames, or identify an object that is to be tracked based on the input from an operator, e.g., via input unit 110. Tracking module 210 processes first digital image data of multiple first image frames to identify and track an object over the multiple image frames to generate the location information of the object being tracked.

In block 630, controller 120 generates a control signal based on the location information of the object being tracked to control the operation of a second camera. Controller 120 may transmit the control signal to the second camera (e.g., a narrow-angle camera) to control the movement of the second camera, e.g., using a communication module. For example, controller 120 may transmit the control signal to manipulate the second camera to pan and/or zoom in/out the second camera. Using the control signal, controller 120 operates the second camera to capture a feature part (e.g., a face) of the object (e.g., a person) being tracked. Controller 120 may use the positional relationship between the first camera and the second camera and the location information of the object being tracked in the first image frame to generate the control signal to control the movement of the second camera.

In block 640, input unit 110 receives as a second input a second video having at least one second image frame. The second image frame(s) may be captured or acquired by a second image capturing device (e.g., a narrow-angle camera). Input unit 110 may transform the second image frames into second digital image data using any of a variety of well-known data processing techniques described above in conjunction with the processing of the first image frames.

In block 650, detection module 220 processes the second digital image data of at least one second image frame to identify or detect a feature part (e.g., a face) of an object (e.g., a person) being tracked. Detection module 220 may use any of a variety of well-known face detecting algorithms to detect the face of the person. In some embodiments, detection module 220 may apply one or more feature screening filters (e.g., horizontal and vertical screening filters 510 and 520 of FIG. 5A) to the second digital image data to detect the face or facial features of the person. As described in detail above, detection module 220 may detect the face of the person when the difference in intensity between the upper and lower parts of the horizontal feature screening filter exceeds a predetermined horizontal threshold, and/or the difference in intensity between the center part of the vertical feature screening filter and the marginal (i.e., left and right) parts of the vertical feature screening filter exceeds a predetermined vertical threshold.

In block 660, comparison module 230 compares the detected feature part of the object being tracked with feature parts of candidate objects. Comparison module 230 may compare the feature part (e.g., a facial feature) of the object (e.g., a person) being tracked with feature parts of candidate objects to determine if there is a match. As described in detail above, comparison module 230 may use any of a variety of facial recognition algorithms to compare the facial feature detected by detection module 220 with facial features of the candidate objects. In some embodiments, the object being tracked is compared to some or all of the candidate objects to identify similarities.

In block 670, comparison module 230 determines whether there is a match between the feature part of the object being tracked and the feature parts of candidate objects. Comparison module 230 may determine that there is a match based on the similarities between the target image and the candidate images, for example, when the candidate image(s) has a distance(s) less than a threshold distance from the target image. If comparison module 230 determines that there is a match between the feature part of the object being tracked and the feature parts of the candidate objects, then, in block 680, comparison module 230 causes the display of an image frame (e.g., the target image and the candidate images) which includes the feature part of the object being tracked on a display device.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In light of the present disclosure, those skilled in the art will appreciate that the systems, apparatus, and methods described herein may be implemented in hardware, software, firmware, middleware, or combinations thereof and utilized in systems, subsystems, components, or sub-components thereof. For example, a method implemented in software may include computer code to perform the operations of the method. This computer code may be stored in a machine-readable medium, such as a computer-readable or processor-readable medium or a computer program product, or transmitted as a computer data signal embodied in a carrier wave, or a signal modulated by a carrier, over a transmission medium or communication link. The machine-readable medium may include any medium capable of storing or transferring information in a form readable and executable by a machine (e.g., by a processor, a computer, etc.).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," or the like include the number recited and refer to ranges which can be subsequently broken down into subranges as discussed above.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A surveillance system comprising:
   a tracking module configured to process first digital image data of a first image frame that is acquired through the use of a first image capturing device to track an object in the first image frame and to generate location information of the object using the first digital image data;
   a controller configured
      to map a first point in the first image frame to a second point in a second image frame based on a previously defined correlation between the first image frame and the second image frame, the second image frame being acquired through the use of a second image capturing device,
      to define a positional relationship between the first image capturing device and the second image capturing device based on the mapping of the first point in the first image frame to the second point in the second image frame,
      to generate a control signal based on the location information and the positional relationship, and
      to transmit the control signal to the second image capturing device to control the movement of the second image capturing device to allow the second image capturing device to acquire a third image frame that includes the object; and
   a detection module configured to process second digital image data of the third image frame to detect a feature part of the object using the second digital image data.

2. The surveillance system of claim 1, further comprising an input unit configured to receive the first image frame from the first image capturing device and to transform the first image frame into the first digital image data, and further configured to receive the third image frame from the second image capturing device and to transform the third image frame into the second digital image data.

3. The surveillance system of claim 1, further comprising a memory configured to store the first digital image data and the second digital image data.

4. The surveillance system of claim 1, further comprising a comparison module configured to compare the feature part of the object with feature parts of candidate objects to determine matches between the feature part of the object and the feature parts of the candidate objects.

5. The surveillance system of claim 4, further comprising an output unit that is configured to display the feature part of the object when the feature part of the object matches one of the feature parts of one of the candidate objects.

6. The surveillance system of claim 1, wherein the tracking module is further configured to track the object using an object tracking algorithm.

7. The surveillance system of claim 6, wherein the object tracking algorithm includes a kernel-based tracking algorithm, a contour tracking algorithm, or a particle filtering algorithm.

8. The surveillance system of claim 1, wherein the tracking module is further configured to determine coordinates of the first digital image data that correspond to location of the object in the first image frame, and to generate the location information of the object using the coordinates.

9. The surveillance system of claim 1, wherein the control signal controls the second image capturing device to pan and/or zoom in/out to allow the second image capturing device to capture the feature part of the object.

10. The surveillance system of claim 1, wherein the detection module is further configured to perform a face detecting algorithm to detect the feature part of the object.

11. The surveillance system of claim 10, wherein the face detecting algorithm includes an AdaBoost algorithm.

12. The surveillance system of claim 4, wherein the comparison module is further configured to compare the feature part of the object with the feature parts of the candidate objects using an object recognition algorithm.

13. The surveillance system of claim 1, wherein the object being tracked is a person and the feature part of the object includes a face of the person.

14. A surveillance method comprising:
receiving a first image frame captured by a first image capturing device;
transforming the first image frame into first digital image data;
generating location information of an object using the first digital image data;
receiving a second image frame captured by a second image capturing device;
mapping a first point in the first image frame to a second point in the second image frame based on a previously defined correlation between the first image frame and the second image frame;
defining a positional relationship between the first image capturing device and the second image capturing device based on the mapping the first point in the first image frame to the second point in the second image frame;
generating a control signal based on the location information and the positional relationship;
transmitting the control signal to the second image capturing device to control the movement of the second image capturing device to allow the second image capturing device to acquire a third image frame that includes the object;
transforming the third image frame into second digital image data; and
detecting a feature part of the object from the second digital image data.

15. The surveillance method of claim 14, further comprising:
comparing the feature part of the object with feature parts of candidate objects; and
determining matches between the feature part of the object and the feature parts of the candidate objects.

16. The surveillance method of claim 14, wherein the object is tracked using an object tracking algorithm.

17. The surveillance method of claim 14, wherein detecting the feature part of the object comprises applying a horizontal feature filter and a vertical feature filter to the second digital image data.

18. The surveillance method of claim 14, wherein the second digital image data represents the intensity of the second image frame and the detecting the feature part of the object comprises determining differences in intensity between regions of the second image frame.

19. The surveillance system of claim 1, wherein the detection module is configured to detect the feature part of the object by applying a horizontal feature filter and a vertical feature filter to the second digital image data.

20. The surveillance system of claim 1, wherein the second digital image data represents the intensity of the second image frame, the detection module being configured to detect the feature part of the object based on differences in intensity between regions of the second image frame.

* * * * *

UNITED STATES PATENT AND TRADEMARK OFFICE
CERTIFICATE OF CORRECTION

PATENT NO. : 8,564,667 B2  Page 1 of 1
APPLICATION NO. : 12/545728
DATED : October 22, 2013
INVENTOR(S) : Yun It is certified that error appears in the above-identified patent and that said Letters Patent is hereby corrected as shown below:

On the Title Page, in Item (56), under "OTHER PUBLICATIONS", in Column 2, Line 1, delete "et al" and insert -- et al., --, therefor.

On the Title Page, in Item (56), under "OTHER PUBLICATIONS", in Column 2, Line 2, delete "Nonlinear/Nun-Gaussian" and insert -- Nonlinear/Non-Gaussian --, therefor.

On the Title Page, in Item (56), under "OTHER PUBLICATIONS", in Column 2, Line 4, delete "et al" and insert -- et al., --, therefor.

On the Title Page, in Item (56), under "OTHER PUBLICATIONS", in Column 2, Line 7, delete "et al" and insert -- et al., --, therefor.

On the Title Page, in Item (56), under "OTHER PUBLICATIONS", in Column 2, Line 10, delete "et al" and insert -- et al., --, therefor.

In the Specification

In Column 4, Lines 64-65, delete "Digital Mobile Multimedia (DMB)," and insert -- Digital Multimedia Broadcasting (DMB), --, therefor.

In Column 8, Line 10, delete "$x_\pi$, is" and insert -- $x_\pi$ is --, therefor.

In Column 8, Line 11, delete "$x_\pi$, is" and insert -- $x_\pi$ is --, therefor.

In Column 8, Line 13, delete "$x_\pi$, on" and insert -- $x_\pi$ on --, therefor.

Signed and Sealed this
Seventh Day of October, 2014

Michelle K. Lee
*Deputy Director of the United States Patent and Trademark Office*